United States Patent [19]

Neuray et al.

[11] Patent Number: 4,482,672

[45] Date of Patent: Nov. 13, 1984

[54] THERMOPLASTIC MOULDING COMPOSITIONS OF POLYCARBONATE, POLYALKYLENE TEREPHTHALATE, GRAFT COPOLYMER AND POLYETHYLENE

[75] Inventors: Dieter Neuray, New Martinsville, W. Va.; Werner Nouvertné; Rudolf Binsack, both of Krefeld, Fed. Rep. of Germany; Dieter Rempel; Peter R. Müller, both of Leverkusen, Fed. Rep. of Germany

[73] Assignee: Bayer Aktiengesellschaft, Leverkusen, Fed. Rep. of Germany

[21] Appl. No.: 487,501

[22] Filed: Apr. 22, 1983

Related U.S. Application Data

[63] Continuation-in-part of Ser. No. 373,987, May 3, 1982, abandoned.

[30] Foreign Application Priority Data

May 9, 1981 [DE] Fed. Rep. of Germany ....... 3118526

[51] Int. Cl.³ .................. C08L 67/02; C08L 69/00
[52] U.S. Cl. ................................ 525/67; 525/64; 525/176
[58] Field of Search ............... 525/64, 67, 439, 176

[56] References Cited

U.S. PATENT DOCUMENTS

| | | | |
|---|---|---|---|
| 3,435,093 | 3/1969 | Cope | 525/176 |
| 3,578,729 | 5/1971 | Brinkmann | 525/176 |
| 3,864,428 | 2/1975 | Nakamura | 525/67 |
| 4,172,859 | 10/1979 | Epstein | 525/109 |
| 4,180,494 | 12/1979 | Fromuth | 525/63 |
| 4,226,950 | 10/1980 | Holub | 525/67 |
| 4,245,058 | 1/1981 | Liu | 525/148 |
| 4,257,937 | 3/1981 | Cohen | 525/67 |
| 4,260,690 | 4/1981 | Binsack | 525/64 |
| 4,260,693 | 4/1981 | Liu | 525/148 |
| 4,264,487 | 4/1981 | Fromuth | 525/67 |
| 4,280,948 | 7/1981 | Dieck | 525/64 |
| 4,292,233 | 9/1981 | Binsack | 525/69 |
| 4,320,212 | 3/1982 | Liu | 525/166 |

FOREIGN PATENT DOCUMENTS 53-129246 11/1978 Japan .

*Primary Examiner*—John C. Bleutge
*Assistant Examiner*—Patricia Short
*Attorney, Agent, or Firm*—Connolly and Hutz

[57] ABSTRACT

Moulding compositions of aromatic polycarbonate, polyalkylene terephthalate and a certain graft copolymer which may be processed into mouldings characterized by high multiaxial impact strength, exhibit an increased Vicat B-temperature if they contain a low amount of an ethylene homo- or copolymer.

5 Claims, No Drawings

THERMOPLASTIC MOULDING COMPOSITIONS OF POLYCARBONATE, POLYALKYLENE TEREPHTHALATE, GRAFT COPOLYMER AND POLYETHYLENE

This application is a continuation-in-part of parent application Ser. No. 373,987, filed May 3, 1982, now abandoned.

This invention relates to thermoplastic moulding compositions of aromatic polycarbonate, polyalkylene terephthalate, a certain graft polymer and an ethylene homo- or copolymer.

Thermoplastic moulding compositions based on polycarbonate, polyalkylene terephthalate and, optionally, graft polymer are known; cf., for example, German Offenlegungsschrift No. 2,622,414 (=U.S. Pat. No. 4,044,073), German Auslegeschrift No. 1,187,793 (=U.S. Pat. No. 3,218,372), German Auslegeschrift No. 2,343,609 (=U.S. Pat. No. 3,864,528), published European patent application Nos. 0 020 605 and 0 025 920.

Although the moulding compositions mentioned above have many positive properties, they are not suitable for certain specialised applications. Thus, the impact strength thereof in the event of multiaxial stressing, which is very important, for example, for parts of housings that are subjected to impact, is not always entirely satisfactory.

Accordingly, an object of the present invention is to provide moulding compositions based on polycarbonate and polyalkylene terephthalate which are more suitable for these applications, but which largely retain the well known favourable physical and chemical properties of polycarbonate/polyalkylene terephthalate mixtures.

It has now surprisingly been found that polycarbonate/polyalkylene terephthalate mixtures to which a selected graft copolymer has been added show high multiaxial impact strength.

The present invention relates to thermoplastic moulding compositions comprising:

(A) from 1 to 99 parts, by weight, preferably from 20 to 80 parts, by weight, more preferably from 30 to 60 parts, by weight, of polyalkylene terephthalate;

(B) from 1 to 99 parts by weight, preferably from 20 to 80 parts, by weight, more preferably from 40 to 70 parts, by weight, of an aromatic polycarbonate which is free from o,o,o',o'-tetramethyl bisphenol residues; and (C) from 1 to 30 parts, by weight, preferably from 1 to 20 parts, by weight, more preferably from 3 to 12 parts, by weight, of a graft copolymer having a glass transition temperature below $-20°$ C., components (A), (B) and (C) totalling 100 parts, by weight, characterised in that the graft copolymer (C) is selected from:

(1) graft copolymers obtainable by grafting (I) from 10 to 25%, by weight, preferably from 10 to 35%, by weight, more preferably from 15 to 25%, by weight, based on (1), of at least one (meth)acrylic acid ester and/or of a mixture of from 10 to 35%, by weight, preferably from 20 to 35%, by weight, based on the mixture, of acrylonitrile and from 65 to 90%, by weight, preferably from 65 to 80%, by weight, based on the mixture, of styrene; onto (II) from 60 to 90%, by weight, preferably from 65 to 90%, by weight, more preferably from 75 to 85%, by weight, based on (1), of a butadiene polymer containing at least 70%, by weight, based on (II), of butadiene residues as the graft base; the gel content of the graft base (II) amounting to $\geq 70\%$ (as measured in toluene according to the method described on page 10), the degree of grafting, G, to from 0.15 to 0.55 and the average particle diameter, $d_{50}$, of the graft copolymer (B) to from 0.2 to 0.6 μm, preferably from 0.3 to 0.5 μm;

(2) graft copolymers of:

(a) from 80 to 98%, by weight, preferably from 85 to 97%, by weight, based on (2), of an acrylate rubber having a glass transition temperature below $-20°$ C. as the graft base; and (b) from 2 to 20%, by weight, preferably from 3 to 15%, by weight, based on (2), of at least one polymerisable ethylenically unsaturated monomer, of which the homo- or co-polymer(s) formed in the absence of (a) would have a glass transition temperature above $25°$ C., as the graft monomer;

the monomer (b) having been grafted onto the completely broken latex, suspended in water, of (a) in the absence of suspending agents. Car manufacturers require the highest possible softening temperatures for moulding compositions for use in the automotive sector. Although the known moulding compositions based on polycarbonate, polyalkylene terphthalate and graft copolymer have in general excellent properties, their softening temperatures are often too low. The standards often demand a Vicat-B temperature of at least $120°$ C., and if this temperature can be exceeded, there is a certain guarantee that the parts manufactured from such compositions do not suffer any damage at the temperatures used for the hardening of the coatings.

Accordingly, it is a further object of the present invention to provide thermoplastic moulding compositions based on polycarbonate, polyalkylene terephthalate and graft copolymer having an increased softening temperature (Vicat-B).

The present invention, therefore, also relates to thermoplastic moulding compositions comprising components (A), (B) and (C) in the amounts specified above, characterised in that the compositions additionally contain (D) from 0.5 to 4, preferably from 1 to 3, parts by weight per 100 parts by weight of (A+B+C) of at least one ethylene homo- or copolymer.

Polyalkylene terephthalates (A) suitable for the purposes of the present invention are reaction products of aromatic dicarboxylic acids or reactive derivatives thereof, for example dimethyl esters or anhydrides, and aliphatic, cycloaliphatic or araliphatic diols and mixtures of these reation products.

Preferred polyalkylene terephthalates (A) may be produced from terephthalic acid or reactive derivatives thereof and aliphatic or cycloaliphatic diols containing from 2 to 10 carbon atoms using known methods, (Kunststoff-Handbuch, Vol. VIII, pages 695 et seq., Carl Hanser Verlag, Munich, 1973).

Preferred polyalkylene terephthalates (A) contain at least 80 mole percent, preferably at least 90 mole percent, based on the dicarboxylic acid component, of terephthalic acid residues and at least 80 mole percent, preferably at least 90 mole percent, based on the diol component, of ethylene glycol and/or 1,4-butane diol residues.

In addition to terephthalic acid residues, the preferred polyalkylene terephthalates (A) may contain up to 20 mole percent of residues of other aromatic dicarboxylic acids containing from 8 to 14 carbon atoms or of aliphatic dicarboxylic acids containing from 4 to 12 carbon atoms, such as residues of phthalic acid, isphthalic acid, napthalene-2,6-dicarboxylic acid, 4,4'-diphenyl dicarboxylic acid, succinic acid, adipic acid, sebacic acid, azelaic acid and cyclohexane diacetic acid.

In addition to ethylene glycol or 1,4-butane diol residues, the preferred polyalkylene terephthalates (A) may contain up to 20 mole percent of other aliphatic diols containing from 3 to 12 carbon atoms or of cycloaliphatic diols containing from 6 to 21 carbon atoms, for example residues of 1,3-propane diol, 2-ethyl-1,3-propane diol, neopentyl glycol, 1,5-pentane diol, 1,6-hexane diol, cyclohexane-1,4-dimethanol, 3-methyl-2,4-pentane diol, 2-methyl-2,4-pentane diol, 2,2,4-trimethyl-1,3- and 1,6-pentane diol, 2-ethyl-1,3-hexane diol, 2,2-diethyl-1,3-propane diol, 2,5-hexane diol, 1,4-di-($\beta$-hydroxyethoxy)-benzene, 2,2-bis-(4-hydroxycyclohexyl)-propane, 2,4-dihydroxy-1,1,3,3-tetramethyl cyclobutane 2,2-bis-(3-$\beta$-hydroxyethoxyphenyl)-propane and 2,2-bis-(4-hydroxypropoxyphenyl)-propane (German Offenlegungsschrift Nos. 2,407,674; 2,407,776 and 2,715,932). The polyalkylene terephthalates (A) may be branched by the incorporation of relatively small quantities of tri- or tetra-hydric alcohols or tri- or tetra-basic carboxylic acids of the type described, for example, in German Offenlegungsschrift No. 1,900,270 and U.S. Pat. No. 3,692,744. Examples of preferred branching agents are trimesic acid, trimellitic acid, trimethylol ethane, trimethylol propane and pentaerythritol.

It is advisable to use no more than 1 mole percent of the branching agent, based on the acid component.

Particularly preferred polyalkylene terephthalates (A) are polyalkylene terephthalates which have been produced solely from terphthalic acid and reactive derivatives thereof, for example dialkyl esters, and ethylene glycol and/or 1,4-butane diol, and also mixtures of these polyalkylene terephthalates.

Other preferred polyalkylene terephthalates (A) are copolyesters produced from at least two of the above-mentioned acid components and/or from at least two of the above-mentioned alcohol components. Particularly preferred copolyesters are poly-(ethylene glycol/1,4-butane diol)-terephthalates.

The polyalkylene terephthalates preferably used as component (A) generally have an intrinsic viscosity of from 0.4 to 1.5 dl/g, preferably from 0.5 to 1.3 dl/g, more preferably from 0.6 to 1.2 dl/g, as measured in phenol/o-dichlorobenzene (1:1 parts, by weight) at 25° C.

In the context of the present invention, aromatic polycarbonates (B) are understood to be homopolycarbonates, copolycarbonates and mixtures of these polycarbonates which are based, for example, on at least one of the following diphenols: hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides bis-(hydroxyphenyl)-sulphones and $\alpha,\alpha'$-bis-(hydroxyphenyl)-diisopropylbenzenes, as well as nucleus-alkylated and nucleus-halogenated derivatives thereof. These and other suitable diphenols are described, for example, in U.S. Pat. Nos. 3,028,365; 3,275,601; 3,148,172; 3,062,781; 2,991,273; 3,271,367; 2,999,835; 2,970,131 and 2,999,846, in German Offenlegungsschrift Nos. 1,570,703, 2,063,050, 2,063,052, 2,211,956 and 2,211,957, in French Pat. No. 1,561,518 and in H. Schnell's book entitled "Chemistry and Physics of Polycarbonates", Interscience Publishers, New York, 1964.

Preferred diphenols are, for example, 4,4'-dihydroxydiphenyl, 2,4-bis-(4-hydroxyphenyl)-2-methylbutane, $\alpha,\alpha'$-bis-(4-hydroxyphenyl)-p-diisopropylbenzene, 2,2-bis-(3-methyl-4-hydroxyphenyl)-propane and 2,2-bis-(3-chloro-4-hydroxyphenyl)-propane.

Particularly preferred diphenols are, for example, 2,2-bis-(4-hydroxyphenyl)-propane, 2,2-bis-(3,5-dichloro-4-hydroxyphenol)-propane, 2,2-bis-(3,5-dibromo-4-hydroxyphenyl)-propane and 1,1-bis-(4-hydroxyphenyl)-cyclohexane.

o,o,o',o'-tetramethylbisphenol polycarbonates, which are not intended to be part of the aromatic polycarbonates (B), are, for example, bis-(3,5-dimethyl-4-hydroxyphenyls), bis-(3,5-dimethyl-4-hydroxyphenyl)-alkanes, bis-(3,5-dimethyl-4-hydroxyphenyl)-cycloalkanes, bis-(3,5-dimethyl-4-hydroxyphenyl)-sulphides, bis-(3,5-dimethyl-4-hydroxyphenyl)-ethers, bis-(3,5-dimethyl-4-hydroxyphenyl)-ketones, bis-(3,5-dimethyl-4-hydroxyphenyl)-sulphoxides, $\alpha,\alpha'$-bis-(3,5-dimethyl-4-hydroxyphenyl)-diisopropyl benzenes and nucleus-halogenated derivatives thereof, particularly bis-(3,5-dimethyl-4-hydroxyphenyl)-methane, 2,2-bis-(3,5-dimethyl-4-hydroxyphenyl)-propane, 2,4-bis-(3,5-dimethyl-4-hydroxyphenyl)-2-methyl butane, 1,1-bis-(3,5-dimethyl-4-hydroxyphenyl)-cyclohexane, $\alpha,\alpha'$-bis-(3,5-dimethyl-4-hydroxyphenyl)-p-diisopropyl benzene and bis-(3,5-dimethyl-4-hydroxyphenyl)-sulphone.

The aromatic polycarbonates (B) may be branched by the incorporation of small quantities, preferably from 0.05 to 2.0 mole percent (based on the diphenols used), of at least trifunctional compounds, for example compounds containing 3 or more phenolic hydroxyl groups.

The aromatic polycarbonates (B) should generally have average molecular weights, $\overline{M}_w$, of from 10,000 to more than 200,000, preferably from 20,000 to 80,000 as determined by relative viscosity measurements in dichloromethane at 25° C. using a concentration of 0.5%, by weight.

Small quantities of low molecular weight polycarbonates, for example having an average degree of polycondensation of from 2 to 20, may also be added to and mixed with the high molecular weight polycarbonates having molecular weights, $\overline{M}_w$, of from 10,000 to 200,000.

Chain-terminators, such as phenol, halo-phenols or alkyl phenols, are used in known manner in the calculated quantities for adjusting the molecular weight, Mw, of the polycarbonates (B).

The polymers (C) include graft copolymers having elastomeric properties of the type obtainable essentially from at least two of the following monomers: butadiene, styrene, acrylonitrile and (meth)acrylic acid esters containing from 1 to 18 carbon atoms in the alcohol component; i.e. polymers of the type described in principle, for example, in "Methoden der Organischen Chemie", (Houben-Weyl), Vol. 14/1, Georg Thieme Verlag, Stuttgart 1961, pages 393 to 406 and in C. B. Bucknall "Toughened Plastics", Appl. Science Publishers, London 1977. Preferred polymers (C) have a gel content of more than 20%, by weight, more preferably more than 40%, by weight.

(Meth)acrylic acid esters (I) are esters of acrylic acid or methacrylic acid and monohydric alcohols containing from 1 to 8 carbon atoms.

In addition to butadiene residues, the graft base (II) may contain up to 30%, by weight, based on (II), of residues of other ethylenically unsaturated monomers, such as, styrene, acrylonitrile, esters of acrylic or methacrylic acid containing from 1 to 4 carbon atoms in the alcohol component, such as methyl acrylate, ethyl acrylate, methyl methacrylate and ethyl methacrylate. The preferred graft base (II) consists of pure polybutadiene.

Since, as is known, the graft monomers (I) cannot be completely grafted onto the graft base (II) during the grafting reaction, graft copolymers in the context of the present invention are also to be understood to be products of the type which, in addition to the actual graft copolymers, also contain homo- and co-polymers of the graft monomers (I) used.

The degree of grafting, G, is the ratio, by weight, of graft monomers grafted on to graft base and has no dimension.

The average particle diameter, $d_{50}$, is that diameter above and below which 50%, by weight, of the particles lie. It may be determined by ultracentrifuge measurements (W. Scholtan, H. Lange, Kolloid. Z. and Z. Polymere 250 (1972), 782–796) or by electron microscopy and subsequent counting out of the particles (G. Kampf, H. Schuster, Angew. Makromolekulare Chemie 14, (1970), 111–129) or by light scattering measurements.

Compositions of the graft (2), apart from the absence of the suspending agent, are described, for example in German Auslegeschrift No. 2,444,584 ($\cong$U.S. Pat. No. 4,022,748) and in German Offenlegungsschrift No. 2,726,256 ($\cong$U.S. Pat. No. 4,096,202).

The advantageous graft copolymers of type (2) are obtained when monomer (b) is grafted onto the completely broken latex, suspended in water, of (a) in the absence of suspending agents. The powder-form graft copolymer obtained may subsequently be dried and homogenised with the other components in the required ratio under the action of shearing forces in such a way that the average particle diameter, $d_{50}$, of (C) in the mixture according to the present invention amounts to from 0.05 to 3 $\mu$m, preferably from 0.1 to 2 $\mu$m, more preferably from 0.2 to 1 $\mu$m.

The expression "in the absence of suspending agents" means the absence of substances which could be suspended in the aqueous phase depending on the type and quantity of graft monomers (b). This definition does not exclude the presence of substances which have had a suspending effect, for example, in the production of a grafted graft base (a). In such cases, the coagulant or precipitant used for breaking the latex (a) has to be added in a quantity which neutralises the suspending effect of the substances used in the preliminary stage. In other words, it is important to ensure that the graft monomers (b) do not form a (stable) emulsion in the aqueous phase.

As part of the moulding compositions according to the present invention, a graft copolymer (C) produced in this way in the absence of suspending agents may be dispersed in the other resin components to an extremely small particle size which remains substantially unchanged even over prolonged processing times at elevated temperature.

The expression "extremely small particle size" means that the number, shape and size of the graft copolymer particles used still correspond substantially to the number, shape and size of the graft copolymer particles introduced into the other, melted resin components, even after homogenisation.

The acrylate rubbers (a) of the polymers (C) (2) are preferably polymers of acrylic acid alkyl esters, optionally containing up to 40%, by weight, of other polymerisable, ethylenically unsaturated monomers. Providing the acrylate rubbers used as graft base (a) are in turn graft products having a diene rubber core, as described on page 13, the diene rubber core is not included in the calculation of this percentage. Preferred polymerisable acrylic acid esters include $C_1$–$C_8$ alkyl esters, for example methyl, ethyl, butyl, octyl and 2-ethylhexyl esters; halo-alkyl esters, preferably halo-$C_1$–$C_8$ alkyl esters, such as benzyl acrylate and phenethyl acrylate. They may be used either individually or in admixture.

The acrylate rubbers (a) may be uncross-linked or cross-linked and are preferably partially cross-linked.

Monomers containing more than one polymerisable double bond may be copolymerised for cross-linking. Preferred examples of cross-linking monomers are esters of unsaturated monocarboxylic acids containing from 3 to 8 carbon atoms and unsaturated monohydric alcohols containing from 3 to 12 carbon atoms or saturated polyols containing from 2 to 4 OH-groups and from 2 to 20 carbon atoms, such as ethylene glycol dimethacrylate, allyl methacrylate; polyunsaturated heterocyclic compounds, such as trivinyl and triallyl cyanurate and isocyanurate, tris-acryloyl-s-triazines, particularly triallyl cyanurate; polyfunctional vinyl compounds, such as di- and tri-vinyl benzenes, and also triallyl phosphate and diallyl phthalate.

Preferred cross-linking monomers are allyl methacrylate, ethylene glycol dimethacrylate, diallyl phthalate and heterocyclic compounds containing at least three ethylenically unsaturated groups.

Particularly preferred cross-linking monomers are the cyclic monomers triallyl cyanurate, triallyl isocyanurate, trivinyl cyanurate, triacryloyl hexahydro-s-triazine and triallyl benzenes.

The cross-linking monomers are preferably used in quantities of from 0.02 to 5%, by weight, more preferably from 0.05 to 2%, by weight, based on the graft base (a).

In the case of cyclic cross-linking monomers containing at least three ethylenically unsaturated groups, it is advantageous to limit the quantity of <1%, by weight, of graft base (a).

Preferred "other" polymerisable, ethylenically unsaturated monomers which, in addition to the acrylic acid esters, may optionally be used for producing the graft base (a) are, for example, acrylonitrile, styrene, $\alpha$-methyl styrene, acrylamides, vinyl-$C_1$–$C_6$ alkyl ethers. Preferred acrylate rubbers as the graft base (a) are emulsion polymers having a gel content of $\geqq$60%, by weight.

The gel content of the graft base (a) is determined in dimethyl formamide at 25° C. (M. Hoffmann, H. Krömer, R. Kuhn, Polymeranalytik I und II, Georg Thieme Verlag, Stuttgart 1977).

Acrylate rubbers as the graft base (a) may also be products containing a cross-linked diene rubber of one or more conjugated dienes, such as polybutadiene, or a copolymer of a conjugated diene with an ethylenically unsaturated monomer, such as styrene and/or acrylonitrile, as the core.

The proportion of polydiene core in the graft base (a) may amount to from 0.1 to 80%, by weight, preferably from 10 to 50%, by weight, based on (a). The shell and core may be uncross-linked, partly cross-linked or highly cross-linked independently of one another.

Particularly preferred graft bases (a) for graft copolymers (C) based on polyacrylic acid esters are summarised once again in the following:

(1) acrylic acid ester homo- and co-polymers without a diene rubber core; and
(2) acrylic acid ester homo- and co-polymere containing a diene rubber core.

The grafting yield, i.e. the quotient of the quantity of monomers (b) grafted on and the quantity of graft monomers (b) used, generally amounts to from 20 to 80%, by weight, and may be determined by the method described by M. Hoffmann, H. Krömer, R. Kuhn in Polymeranalytik, Vol. 1, Georg Thieme Verlag, Stuttgart 1977.

Preferred graft monomers (b) are α-methyl styrene, styrene, acrylonitrile, methyl methacrylate or mixtures thereof. Preferred graft monomer mixtures are mixtures of styrene and acrylonitrile in a ratio, by weight, of from 90:10 to 50:50.

It is also possible to use as the graft base (a) acrylate rubbers of the type which accumulate in the form of an aqueous emulsion (latex) and of which the latex particles contain from 1 to 20%, by weight, preferably from 1 to 10%, by weight, based on (a), of monomers already grafted on in aqueous emulsion of which the homo- or co-polymers would have glass transition temperatures of $>0°$ C.

Preferred grafted-on monomers of this type are alkyl acrylates, alkyl methacrylates, styrene, acrylonitrile, α-methyl styrene and/or vinyl acetate.

Graft bases (a) of this type are produced, for example, by emulsion polymerisation or emulsion graft polymerisation. However, they may also be obtained by preparing an acrylate rubber by solution or bulk polymerisation, subsequently grafting on the graft monomers and then converting the rubbers into an aqueous emulsion which is suitable for further grafting processes.

Accordingly, in addition to the polymers listed on page 13, other suitable graft bases (a) for acrylate rubbers of this particular embodiment are graft polymers, produced in aqueous emulsion, of acrylic acid ester polymers or copolymers optionally containing a diene rubber core and ethylenically unsaturated polymerisable monomers. Preferred ethylene homo- and copolymers (D) have melt flow indices (190° C./21.2N) of from 0.1 to 20, preferably from 3 to 10 g/10 minutes (determined according to DIN 53 735). Preferred ethylene copolymers are polymers consisting of ethylene residues and up to 30% by weight of residues of other copolymerisable monomers. "Other copolymerisable monomers" in this context are, for example, the monomers mentioned above with reference to the production of the graft base and the graft monomers for polymer (C).

Preferred "other copolymerisable monomers are acrylic acid (generally used in amounts of from 1 to 8, preferably from 2 to 6% by weight) and acrylic acid $C_1$–$C_6$ alkyl esters such as the acrylic acid ethyl, n-butyl and tert.-butyl esters (generally used in amounts of from 4 to 15, preferably from 6 to 12% by weight), and mixtures thereof. A particularly preferred ethylene copolymer has 3 to 5% by weight of copolymerised residues of acrylic acid, 10 to 14% by weight of copolymerised residues of acrylic acid tert.-butyl ester, an acid number of 25 to 35 and a melt flow index (190° C./21.2N) of from 4 to 10 g/10 minutes. The above percentages are based on the total weight of the ethylene copolymers.

The moulding compositions according to the present invention may contain conventional additives, such as lubricants and mould release agents, nucleating agents, stabilisers, fillers and reinforcing materials, flameproofing agents and dyes. The filled or reinforced moulding compositions may contain up to 60%, by weight, based on the reinforced moulding composition, of fillers and/or reinforcing materials. Preferred reinforcing materials are glass fibres. Preferred fillers, which may also have a reinforcing effect, are glass beads, mica, silicates, quartz, talcum, titanium dioxide and wollastonite.

The flameproofed moulding compositions generally contain flameproofing agents in a concentration of less than 30%, by weight, based on the flameproofed moulding compositions.

It is possible to use various known flameproofing agents, such as polyhalogen diphenyl, polyhalogen diphenyl ether, polyhalogen phthalic acid and derivatives thereof and polyhalogen oligocarbonates and polycarbonates, the corresponding bromine compounds being particularly effective. In addition, they generally contain a synergist, such as antimony trioxide.

The moulding compositions may be produced in the conventional mixing units, such as mixing rolls, kneaders, single-screw and multiple-screw extruders. The moulding compositions are generally processed at mass temperatures of about 270° C. In order to minimize the thermal load of the melt the use of injection moulding machines is recommended, the shot volume of which is as high as possible, but at least 50% of the total machine capacity. Dwell times of more than 7 minutes should be avoided.

The parts quoted in the following Examples represent parts, by weight, while the percentages quoted represent percentages, by weight.

EXAMPLES

Components used:

(I) A polycarbonate of bisphenol-A, phenol and phosgene, relative viscosity 1.285, as measured on a 0.5% solution in dichloromethane at 25° C.

(II) A polycarbonate of bisphenol-A, phenol and 0.5 mole percent, based on bisphenol-A, of isatin bisphenol, relative viscosity 1.315, measured in the same way as for (I).

(III) A polybutylene terephthalate having an intrinsic viscosity of 1.18 dl/g, as measured in phenol/o-dichlorobenzene (ratio, by weight, 1:1) at 25° C. using an Ubbelohde viscometer.

(IV) A polyethylene terephthalate having an intrinsic viscosity of 0.996 dl/g measured in the same way as for (III).

(V) A polyethylene terephthalate having an intrinsic viscosity of 0.7 dl/g measured in the same way as for (III).

(VI) A graft copolymer consisting of 80% of graft base of cross-linked polybutadiene (gel content above 70%, as measured in toluene) and of 20% of graft monomer of methyl methacrylate.

(VII) A graft copolymer consisting of 80% of graft base of cross-linked polybutadiene (gel content above 70%, as measured in toluene) and of 20% of graft monomer of 72 parts of styrene and 28 parts of acrylonitrile.

(VIII) A terpolymer of ethylene, acrylic acid and t-butyl acrylate in a ratio, by weight, of 89:4:7 having a melt index of 6-8 g/10 mins. (as measured at 190° C. under a load of 21.2N in accordance with DIN 53 735) and a density of 0.924 g/cc (as measured in accordance with DIN 53 479).

(IX) A core-shell graft polymer produced by the following multiple-stage process:

(1) Production of the graft base (1.1) Production of a polybutadiene latex

An emulsion having the following composition is polymerised with stirring at 65° C. in a reactor until the monomers have been completely converted (which takes about 22 hours):

100 parts of butadiene, 1.8 parts of the sodium salt of disproportionated abietic acid, 0.275 part of sodium hydroxide, 0.3 part of n-dodecyl mercaptan, 1.029 part of sodium ethylene diamine tetra-acetate, 0.023 part of potassium persulphate and 176 parts of water A latex is obtained which contains polybutadiene particles having an average diameter ($d_{50}$) of 0.1 μm in a concentration of approximately 36%.

(1.2) Production of an acrylate rubber containing polydiene cores:

The following mixture is introduced with stirring at 63° C. into a reactor:

200 parts of latex (1.1), 5000 parts of water, 14 parts of potassium persulphate, 0.9124 part of triallyl cyanurate and 399.09 part of n-butyl acrylate The following mixtures are then separately introduced into the reactor over a period of 5 hours at 63° C.:

Mixture 1:

90 parts of $C_{14}$-$C_{18}$-Na-alkyl sulphonate and 11,900 parts of water

Mixture 2:

23.09 parts of triallyl cyanurate and 10,101 parts of n-butyl acrylate

The mixture is then left to polymerise for 2 hours at 65° C. The polymers formed have gel contents of from 85 to 95% and average particle diameters ($d_{50}$) of 0.5 μm (polymer content in the latex: 38%).

(2.) Production of the emulsion graft copolymers (2.1) An emulsion graft copolymer of 90% of acrylate rubber (1.2) and 10% of styrene+acrylonitrile.

3296 parts of latex (1.2), 1.5 parts of potassium persulphate and 90 parts of water are introduced into a reactor. The following mixtures are separately introduced into the reactor at 65° C.:

Mixture 1:

39 parts of acrylonitrile and 100 parts of styrene

Mixture 2:

150 parts of water and 4 parts of $C_{14}$-$C_{18}$-Na-alkyl sulphonate

The reaction mixture is left to polymerise for 4 hours at 65° C. (polymer content of the latext: 37.8%).

(2.2) Production of the graft copolymer (C) from the emulsion graft polymer:

18,800 parts of water and

240 Parts of $MgSO_4.7H_2O$ are introduced into a reactor at 70° C. 11,200 parts of latex (2.1) are run into the reactor over a period of 2 hours with stirring.

On completion of the addition, 1 part of potassium persulphate is introduced into the reactor, after which 148 parts of acrylonitrile and 281 parts of styrene are uniformly introduced with stirring over a period of 1 hour. The suspension is then stirred for 1 hour at 90° C., after which polymer (C) is isolated.

Production of the moulding compositions:

The components (see following tables) were melted and homogenised under nitrogen in a twin-screw extruder. The barrel temperature was adjusted in such a way as to guarantee the melt temperature shown in the Table. The mould temperature was 60° C. The melt strand of the mixtures according to the present invention was degassed before leaving the extrusion nozzle, cooled in water, granulated and dried. Processing was carried out in an injection moulding machine.

TABLE 1

| Examples | I | II | III | IV | V | VI | VII | VIII | IX | EFTR* [W · sec.] |
|---|---|---|---|---|---|---|---|---|---|---|
| 1 | — | 60 | 20 | 15 | — | 5 | — | — | — | 113 |
| 2 | 58 | — | — | 35 | — | 5 | — | 2 | — | 115 |
| 3 | 58 | — | 35 | — | — | — | 5 | 2 | — | 111 |
| 4 | 50 | — | 42.5 | — | — | 7.5 | — | — | — | 109 |
| 5 | 40 | — | 52.5 | — | — | 7.5 | — | — | — | 107 |
| 6 | 50 | — | 42.5 | — | — | — | — | — | 7.5 | 111 |
| 7 | 7.9 | — | 63.2 | — | 7.9 | — | 21 | — | — | 91 |
| 8 | 158 | — | 55.3 | — | 7.9 | — | 21 | — | — | 89 |
| 9 | 23.7 | — | 55.3 | — | — | — | 21 | — | — | 86 |
| 10 | 15.8 | — | 63.2 | — | — | — | 21 | — | — | 87 |
| 11 | 7.9 | — | 71.1 | — | — | — | 21 | — | — | 89 |

*Multiaxial impact strength as determined by the EFTR (electronic force/travel recording) test according to DIN 53 443, page 2, penetration of a plate measuring 3 × 60 × 60 mm by a 35 kg weight fixed to a spike (spherical point 20 mm in diameter) dropped from a height of 1 meter. The number of fractures amounted to 100% in all the Examples.

TABLE II

| Examples | I* | III* | VII | VIII | IX | Vicat-B (°C.) |
|---|---|---|---|---|---|---|
| 12 | 52.6 | 40.9 | 5 | 0 | — | 120 |
| 13 | 52.3 | 40.7 | 5 | 0.5 | — | 119 |
| 14 | 52.1 | 40.4 | 5 | 1.0 | — | 125 |
| 15 | 51.5 | 40.0 | 5 | 2.0 | — | 122 |
| 16 | 50.4 | 39.1 | 5 | 4.0 | — | 122 |
| 17 | 49.8 | 38.7 | 10 | 0 | — | 111 |
| 18 | 49.5 | 38.5 | 10 | 0.5 | — | 109 |
| 19 | 49.3 | 38.2 | 10 | 1.0 | — | 114 |
| 20 | 48.7 | 37.8 | 10 | 2.0 | — | 114 |
| 21 | 47.6 | 36.9 | 10 | 4.0 | — | 115 |
| 22 | 52.6 | 40.9 | — | 0 | 5 | 123 |
| 23 | 52.3 | 40.7 | — | 0.5 | 5 | 125 |
| 24 | 52.1 | 40.4 | — | 1.0 | 5 | 127 |
| 25 | 51.5 | 40.0 | — | 2.0 | 5 | 125 |
| 26 | 50.4 | 39.1 | — | 4.0 | 5 | 124 |
| 27 | 49.8 | 38.7 | — | 0 | 10 | 123 |
| 28 | 49.5 | 38.5 | — | 0.5 | 10 | 122 |
| 29 | 49.3 | 38.2 | — | 1.0 | 10 | 125 |
| 30 | 48.7 | 37.8 | — | 2.0 | 10 | 124 |
| 31 | 47.6 | 36.9 | — | 4.0 | 10 | 122 |

Mass temperature: 270° C.
*All the above compositions contained 1.5 parts of pigments/stabilizers The ratio I/III was kept constant.

We claim:

1. Thermoplastic moulding compositions comprising
   (A) from 1 to 99 parts, by weight, of polyalkylene terephthalate;
   (B) from 1 to 99 parts, by weight, of an aromatic polycarbonate free from o,o,o',o'-tetramethylbisphenol residues; and (C) from 1 to 30 parts, by weight, of a graft copolymer having a glass transition temperature below −20° C., which graft copolymer (C) is selected from:
(1) graft copolymers obtainable by grafting
  (I) from 10 to 40%, by weight, based on (1), of at least one (meth)acrylic acid ester and/or of a mixture of from 10 to 35%, by weight, based on the mixture, of acrylonitrile and from 65 to 90%, by weight, based on the mixture, of styrene on
  (II) from 60 to 90%, by weight, based on (1), of a butadiene polymer containing at least 70%, by weight, based on (II), of butadiene residues as the graft base, the gel content of the graft base (II) amounting to $\geq 70\%$ (as measured in toluene), the degree of grafting, G, to from 0.15 to 0.55 and the average particle diameter, $d_{50}$, of the graft copolymer (B) to from 0.2 to 0.6 μm;
(2) graft copolymers of
  (a) from 80 to 98%, by weight, based on (2), of an acrylate rubber having a glass transition temperature below −20° C. as the graft base and
  (b) from 2 to 20%, by weight, based on (2), of at least one polymerizable ethylenically unsaturated monomer, of which the homo- or copolymer formed in the absence of (a) would have a glass transition temperature above 25° C., as the graft monomer the monomer (b) having been grafted onto the completely broken latex, suspended in water, of (a) in the absence of suspending agents;

the quantities of components (A), (B) and (C) totalling 100 parts, by weight, characterized in that the compositions additionally contain (D) a softening temperature increasing amount of from 0.5 to 4 parts by weight per 100 parts by weight of (A+B+C) of at least one ethylene/acrylic acid copolymer containing from 1 to 8% by weight of acrylic acid units based on the copolymer weight.

2. Moulding compositions according to claim 1 wherein the ethylene copolymer (D) additionally contains 4 to 15% by weight of copolymerized acrylic acid/$C_1$ to $C_6$ alkyl ester units.

3. Moulding compositions as claimed in claim 1 or claim 2, characterised in that they contain from 1 to 3 parts by weight of said ethylene copolymer (D).

4. Moulding compositions as claimed in claims 1 or 2, characterised in that component (D) is an ethylene copolymer having 3 to 5% by weight, based on (D), of copolymerised acrylic acid and 10 to 14% by weight, based on (D), of copolymerised acryl acid tert.-butyl ester, an acid number of from 25 to 35 and a melt flow index (190° C./21.2N) of from 4 to 10 g/10 minutes (determined according to DIN 53 735).

5. Moulding compositions as claimed in claims 1 or 2, characterised in that component (D) has a melt flow index (190° C./21.2N) of from 0.1 to 20 g/10 minutes (determined according to DIN 53 735).

* * * * *

UNITED STATES PATENT AND TRADEMARK OFFICE
CERTIFICATE OF CORRECTION

PATENT NO. : 4,482,672
DATED : NOVEMBER 13, 1984
INVENTOR(S) : NEURAY ET AL

It is certified that error appears in the above-identified patent and that said Letters Patent is hereby corrected as shown below:

Column 2, line 9, please change "the graft copolymer (B)" to read --the graft copolymer (C)--.

Column 11, line 19, please change "the graft copolymer (B)" to read --the graft copolymer (C)--.

Signed and Sealed this

First Day of October 1985

[SEAL]

Attest:

DONALD J. QUIGG

Attesting Officer

Commissioner of Patents and Trademarks—Designate